May 29, 1934.  F. B. THOMAS ET AL  1,960,323
LOAD BRAKE DEVICE
Filed Oct. 31, 1931
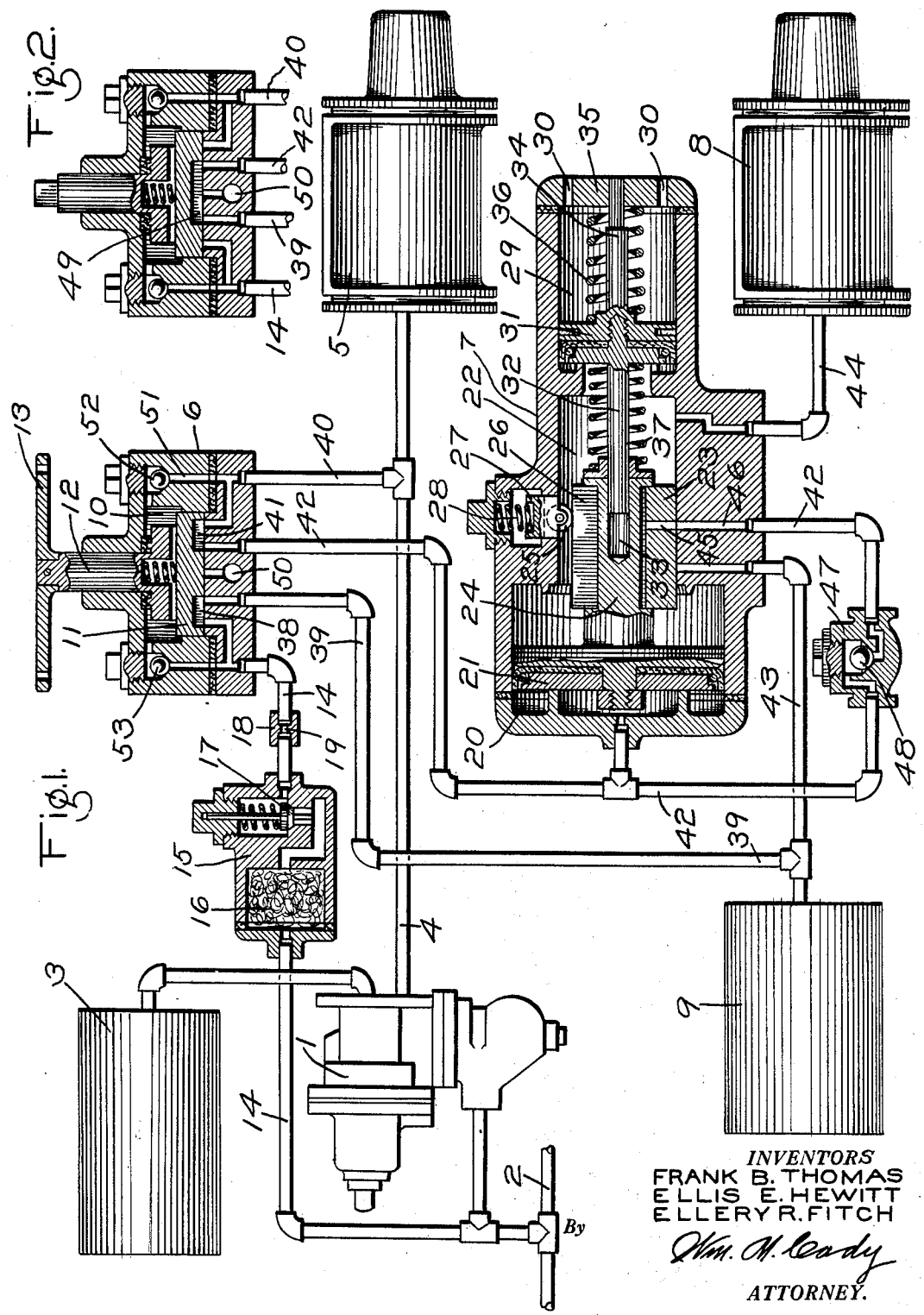
INVENTORS
FRANK B. THOMAS
ELLIS E. HEWITT
ELLERY R. FITCH
By *Wm. M. Cady*
ATTORNEY.

Patented May 29, 1934

1,960,323

UNITED STATES PATENT OFFICE 1,960,323

LOAD BRAKE DEVICE

Frank B. Thomas, Forest Hills, and Ellis E. Hewitt and Ellery R. Fitch, Edgewood, Pa., assignors to The Westinghouse Air Brake Company, Wilmerding, Pa., a corporation of Pennsylvania Application October 31, 1931, Serial No. 572,246

7 Claims. (Cl. 303—23)

This invention relates to fluid pressure brakes, and more particularly to a fluid pressure brake equipment having means for applying the brakes with greater force on loaded cars than on empty or unloaded cars.

Various devices have heretofore been proposed for applying the brakes on loaded cars with greater force than on empty cars, and the principal object of our invention is to provide an improved empty and load fluid pressure brake equipment, which is simple in construction and which can be cheaply manufactured.

Other objects and advantages will appear in the following more detailed description of the invention.

In the accompanying drawing; Fig. 1 is a diagrammatic view, with the principal parts in section, of an empty and load fluid pressure brake equipment embodying our invention; and Fig. 2 a sectional view of the change-over valve device, showing the same in the empty car braking position.

As shown in the drawing, the brake equipment may comprise a triple valve device 1 of the usual form adapted upon a reduction in fluid pressure in the brake pipe 2, to supply fluid under pressure from the usual auxiliary reservoir 3, through pipe 4 to the brake cylinder 5, which brake cylinder in the present instance is the brake cylinder employed for empty car braking.

The equipment also comprises a change-over valve device 6, a load cylinder control valve device 7, a brake cylinder 8 for use on loaded cars, and a load reservoir 9.

The change-over valve device 6, comprises a casing having a valve chamber 10 containing a rotary valve 11 adapted to be operated by a stem 12. The stem 12 carries an operating lever 13, which may be operated manually from either side of the car to effect the rotation of the valve 11.

The valve chamber 10 is charged with fluid under pressure from the brake pipe 2 through a pipe 14, in which is disposed a casing 15 containing a strainer 16 and a check valve 17, the pipe also having a choke fitting 18, provided with a restricted flow passage 19.

The control valve device 7 comprises a casing having a piston chamber 20 containing a piston 21 and a valve chamber 22 at one side of the piston containing a slide valve 23, adapted to be operated by piston 21 through a stem 24. The slide valve 23 is urged to its seat by a roller 25, which engages the wings 26 of the slide valve, the roller being carried by a movable member 27, which is subject to the pressure of a spring 28.

The casing also has a piston chamber 29, open to the atmosphere through ports 30, and containing a piston 31. Said piston carries a stem 32 which extends into a bore 33 of the piston stem 24. The piston is also provided with a guide stem 34 which extends through a bore in the cap plate 35, and said piston is subject to the pressure of a coil spring 36 which urges the piston toward the left. Interposed between the piston 31 and the end of the stem 24 is a coil spring 37, which serves merely to urge the piston 21 to its normal release position, as shown in Fig. 1.

In operation, when the brake pipe is charged with fluid under pressure, the valve chamber 10 of the change-over valve device 6 is also charged, through pipe 14, so as to hold the rotary valve 11 to its seat. With the rotary valve 11 in position, as shown in Fig. 1, for loaded car braking, the pipe 14 is connected, through a cavity 38 in the rotary valve, with a pipe 39, leading to the load reservoir 9, so that said reservoir is charged with fluid at brake pipe pressure.

When the pressure in the brake pipe 2 is reduced to effect an application of the brakes, the triple valve device 1 is operated in the usual manner to supply fluid under pressure from the auxiliary reservoir 3, through pipe 4 to the empty brake cylinder 5, the pressure of fluid supplied to the brake cylinder corresponding with the degree to which the brake pipe pressure is reduced.

Fluid at the pressure supplied to the empty brake cylinder, flows from pipe 4, through a pipe 40, and cavity 41 in rotary valve 11, to a pipe 42 which leads to piston chamber 20 of the load cylinder controlling valve device 7. The piston 21 is then shifted to the right until the stem 32 engages the end of the bore 33. The stem 32 thus acts as a stop for the piston stem 24, and the piston 21 remains in this position until the pressure supplied to the empty brake cylinder and to the piston chamber 20 is sufficient to overcome the pressure of spring 36. The resistance of spring 36 is preferably such that the pressure supplied to the empty brake cylinder will not move the piston 21 against the pressure of spring 36, until the pressure in the empty brake cylinder is sufficient to cause the brake cylinder piston to move out and take up the slack in the brake rigging and apply the brake shoes to the car wheels.

When the pressure of spring 36 has been overcome by the empty brake cylinder pressure acting on piston 21, said piston moves to the right, so that slide valve 23 is shifted to a position, in which a pipe 43, leading to the seat of the valve, is opened to valve chamber 22.

The valve chamber 22 is connected to the load brake cylinder 8, through pipe 44, so that fluid under pressure is now supplied from the load reservoir 9 to the brake cylinder 8. When the fluid pressure in the load brake cylinder 8 and in valve chamber 22 has been increased by flow from the reservoir 9, sufficiently to overcome the differential pressure acting in piston chamber 20, the piston 21 is moved toward the left until the pipe 43 is cut off from the valve chamber 22, so that further flow from the reservoir 9 to the brake cylinder 8 is prevented.

If the pressure in the empty brake cylinder 5 and in piston chamber 20 is further increased by operation of the triple valve device upon a further reduction in brake pipe pressure, the piston 21 will be again shifted to the right so that the valve 23 is again operated to open the pipe 43 to valve chamber 22. Thus the pressure in the load brake cylinder 8 will be built up as the pressure in the empty brake cylinder is increased but to a degree less. However, when the pressure in the valve chamber 22 and the load brake cylinder 8 has been increased to a degree such that this pressure acting on piston 31 will overcome the pressure of spring 36, then the piston 31 will be shifted to the right, so that the stem 32 is moved to the right, thus preventing the spring 36 from acting through the stem 32 to oppose movement of the piston stem 24 to the right. As a result the movement of piston 21 being controlled only by the opposing pressures of the empty brake cylinder 5 and the load brake cylinder 8, will operate the slide valve 23, so as to permit the building up of pressure in the load brake cylinder to substantially equal the pressure in the empty brake cylinder. The spring 36 is preferably such that when the pressure in the empty brake cylinder 5 has been increased to the equalization point, the pressure in the load brake cylinder 8 and valve chamber 22 will be sufficient to overcome the pressure of the spring 36.

When the brake pipe pressure is increased, the triple valve device 1 is operated in the usual manner to release fluid from the brake cylinder 5, and fluid is also released from the piston chamber 20 by way of pipe 42, cavity 41 in rotary valve 11, and pipes 40 and 4.

The piston 21 is then shifted to release position, as shown in Fig. 1, in which a port 45 in the slide valve 23 registers with a passage 46 leading to pipe 42. Fluid is thus released from valve chamber 22 and the load brake cylinder 8, with the fluid from the empty brake cylinder 5. A check valve casing 47 is disposed in the pipe 42 and contains a check valve 48 for preventing back flow, so that in applying the brakes, fluid under pressure supplied to the empty brake cylinder cannot flow through the pipe 42 to the valve chamber 22, thus fluid under pressure is only supplied to the load brake cylinder 8 by operation of the piston 21.

On empty or unloaded cars, the rotary valve 11 of the change-over valve device 6 is shifted by operation of the lever 13 to the position shown in Fig. 2, in which position communication from pipe 14 and the brake pipe 2 to the pipe 39 is cut off, thus preventing the reservoir 9 from being charged with fluid under pressure from the brake pipe. Communication from the empty brake cylinder 5 to the pipe 42 and the piston chamber 20 is also cut off, so that fluid under pressure is not supplied to piston chamber 20 when fluid under pressure is supplied to the empty brake cylinder in effecting an application of the brakes.

Consequently, on empty cars, only the empty brake cylinder 5 is in operation, the load brake cylinder 8 being cut out of action. In the empty position of the rotary valve 11, a cavity 49 connects pipes 39 and 42 with an atmospheric exhaust port 50, so that possible leakage of fluid will not build up pressure either in the reservoir 9 or the piston chamber 20 of the load cylinder controlling valve device.

The rotary valve chamber 10 is connected to the empty brake cylinder pipe 40, through a passage 51, containing a check valve 52, so that in case of an over-reduction in brake pipe pressure or a reduction to a low degree, while the brakes are applied, the pressure in the valve chamber 10 will be maintained by flow from the empty brake cylinder 5, so as to insure that pressure will be maintained in said valve chamber to hold the valve 11 seated.

The check valve 53 in the passage connecting the rotary valve chamber 10 with the pipe 14 is to prevent possible equalization of the empty brake cylinder into the load reservoir 9, in case the change-over valve should be moved to load position after an application of the brakes. The check valve 52 permits flow of fluid at brake pipe pressure from the rotary valve chamber 10 to the empty brake cylinder, when the brake pipe pressure is higher than empty brake cylinder pressure.

The restricted passage 19 is provided to retard the charging of the load reservoir 9, when the change-over valve is set in load position, so that the brake pipe pressure will not be reduced excessively by flow to the load reservoir, when the brake pipe pressure is increased to release the brakes.

While one illustrative embodiment of our invention has been described in detail, it is not our intention to limit its scope to this embodiment or otherwise than by the terms of the appended claims.

Having now described our invention, what we claim as new and desire to secure by Letters Patent, is:

1. In an empty and load brake equipment, the combination with a brake pipe, an empty brake cylinder, and a load brake cylinder, of a valve device for controlling the supply of fluid under pressure to the load brake cylinder, comprising a movable abutment subject to the opposing pressures of the empty brake cylinder and the load brake cylinder, a valve operated by said abutment for controlling the supply of fluid under pressure to the load brake cylinder, a spring, and a movable abutment subject to the opposing pressure of the load brake cylinder and said spring for opposing movement of the first abutment, the second abutment being subject on one side to atmosphere pressure.

2. In an empty and load brake equipment, the combination with a brake pipe, an empty brake cylinder, and a load brake cylinder, of a load reservoir, a controlling valve device operated by fluid under pressure supplied from the empty brake cylinder for supplying fluid under pressure from the load reservoir to the load brake cylinder, and a change-over valve device comprising a valve contained in a valve chamber, said valve having a load position in which the brake pipe is connected to said load reservoir for charging same and in which the empty brake cylinder is connected to said controlling valve device, and means for charging said chamber with fluid under pressure from the brake pipe to maintain said valve seated.

3. In an empty and load brake equipment, the combination with a brake pipe, an empty brake cylinder, and a load brake cylinder, of a load reservoir, a controlling valve device operated by fluid under pressure supplied from the empty brake cylinder for supplying fluid under pressure from the load reservoir to the load brake cylinder, and a change-over valve device comprising a valve contained in a valve chamber, said valve having a load position in which the brake pipe is connected to said load reservoir for charging same and in which the empty brake cylinder is connected to said controlling valve device, and means for supplying fluid under pressure from the empty brake cylinder to said chamber.

4. In an empty and load brake equipment, the combination with a brake pipe, an empty brake cylinder, and a load brake cylinder, of a load reservoir, a controlling valve device operated by fluid under pressure supplied from the empty brake cylinder for supplying fluid under pressure from the load reservoir to the load brake cylinder, and a change-over valve device comprising a valve contained in a valve chamber, said valve having a load position in which the brake pipe is connected to said load reservoir for charging same and in which the empty brake cylinder is connected to said controlling valve device, and means establishing communication from the empty brake cylinder to said chamber and from the brake pipe to said chamber.

5. In an empty and load brake equipment, the combination with a brake pipe, an empty brake cylinder, and a load brake cylinder, of a load reservoir, a controlling valve device operated by fluid under pressure supplied from the empty brake cylinder for supplying fluid under pressure from the load reservoir to the load brake cylinder, and a change-over valve device comprising a valve contained in a valve chamber, said valve having a load position in which the brake pipe is connected to said load reservoir for charging same and in which the empty brake cylinder is connected to said controlling valve device, said change-over valve device having communications through which fluid under pressure may be supplied from the brake pipe to said chamber and from the empty brake cylinder to said chamber, a check valve for preventing back flow from said chamber to the brake pipe, and a check valve for preventing back flow from said chamber to the empty brake cylinder.

6. In an empty and load brake equipment, the combination with a brake pipe, an empty brake cylinder, and a load brake cylinder, of a valve device for controlling the supply of fluid under pressure to the load brake cylinder, comprising a movable abutment subject to the opposing pressures of the empty brake cylinder and the load brake cylinder, a valve operated by said abutment for controlling the supply of fluid under pressure to the load brake cylinder, a spring, and a piston subject to the opposing pressures of the load brake cylinder and said spring for yieldingly opposing movement of said abutment and thereby said valve to supply fluid to the load brake cylinder until the empty brake cylinder pressure has been increased to a predetermined degree.

7. In an empty and load brake equipment, the combination with a brake pipe, an empty brake cylinder, and a load brake cylinder, of a valve device for controlling the supply of fluid under pressure to the load brake cylinder, comprising a movable abutment subject to the opposing pressures of the empty brake cylinder and the load brake cylinder, a valve operated by said abutment for controlling the supply of fluid under pressure to the load brake cylinder, a spring, and a piston subject to the opposing pressures of the load brake cylinder and said spring for yieldingly opposing movement of said abutment and thereby said valve to supply fluid to the load brake cylinder until the empty brake cylinder pressure has been increased to a predetermined degree, said piston being operated upon a predetermined increase in pressure in the load brake cylinder to compress said spring, so that the pressure of said spring does not oppose movement of said abutment.

FRANK B. THOMAS.
ELLIS E. HEWITT.
ELLERY R. FITCH.